US009438417B2

(12) United States Patent
Merchan et al.

(10) Patent No.: US 9,438,417 B2
(45) Date of Patent: Sep. 6, 2016

(54) SYSTEM AND METHOD FOR SHARED KEY AGREEMENT OVER UNTRUSTED COMMUNICATION CHANNELS

(71) Applicant: Robert Bosch GmbH, Stuttgart (DE)

(72) Inventors: Jorge Guajardo Merchan, Pittsburgh, PA (US); Paul Duplys, Markgroningen (DE); Attila Altay Yavuz, Corvallis, OR (US)

(73) Assignee: Robert Bosch GmbH, Stuttgart (DE)

( * ) Notice: Subject to any disclaimer, the term of this patent is extended or adjusted under 35 U.S.C. 154(b) by 3 days.

(21) Appl. No.: 14/457,163

(22) Filed: Aug. 12, 2014

(65) Prior Publication Data

US 2016/0050067 A1 Feb. 18, 2016

(51) Int. Cl.
*H04L 29/06* (2006.01)
*H04L 9/08* (2006.01)
*H04L 9/32* (2006.01)

(52) U.S. Cl.
CPC .......... *H04L 9/0838* (2013.01); *H04L 9/0819* (2013.01); *H04L 9/0861* (2013.01); *H04L 9/0866* (2013.01); *H04L 9/3226* (2013.01); *H04L 9/3242* (2013.01); *H04L 63/0442* (2013.01); *H04L 2209/34* (2013.01); *H04L 2209/805* (2013.01)

(58) Field of Classification Search
CPC ... G06F 21/606; H04L 9/0844; H04L 9/302; H04L 9/3236; H04L 9/0838
USPC ........................................................ 713/171
See application file for complete search history.

(56) References Cited

U.S. PATENT DOCUMENTS

| | | | |
|---|---|---|---|
| 6,363,485 B1 * | 3/2002 | Adams | .................. H04L 9/3231 713/186 |
| 7,602,904 B2 | 10/2009 | Juels et al. | |
| 8,065,533 B2 | 11/2011 | Linnartz | |
| 8,429,405 B2 | 4/2013 | Roth et al. | |
| 8,433,983 B2 | 4/2013 | Tuyls et al. | |
| 2002/0120592 A1 * | 8/2002 | Juels | ....................... H04L 9/308 706/8 |
| 2009/0008924 A1 | 1/2009 | Ophey et al. | |

(Continued)

FOREIGN PATENT DOCUMENTS

EP          1149475 A1    10/2001

OTHER PUBLICATIONS

Gehrmann, Christian, Chris J. Mitchell, and Kaisa Nyberg. "Manual authentication for wireless devices." RSA Cryptobytes 7.1 (2004): 29-37.*

(Continued)

*Primary Examiner* — Syed Zaidi
(74) *Attorney, Agent, or Firm* — Maginot Moore & Beck LLP (57) ABSTRACT

A method of generating cryptographic keys includes generating, with a first processor in a first computing device, error correction data corresponding to first sensor data that are stored in a memory, generating a first cryptographic key with reference to a first hashed value of the first sensor data, generating a first message authentication code (MAC) with reference to the first cryptographic key and the error correction data, and transmitting with a first I/O device in the first computing device the error correction data and the first MAC through a communication channel to a second computing device. The transmitted data enable the second computing device to generate a second cryptographic key with reference to second sensor data.

8 Claims, 7 Drawing Sheets

(56) References Cited

U.S. PATENT DOCUMENTS

2011/0181470 A1 7/2011 Qiu et al.
2011/0296508 A1* 12/2011 Os .................... G06F 21/445
 726/7
2013/0242706 A1 9/2013 Newsome, Jr.

OTHER PUBLICATIONS

Mayrhofer, Rene. "The candidate key protocol for generating secret shared keys from similar sensor data streams." Security and Privacy in Ad-hoc and Sensor Networks. Springer Berlin Heidelberg, 2007. 1-15.*
Mayrhofer et al.; A Human-Verifiable Authentication Protocol Using Visible Laser Light; Second International Conference Conference on Availability, Reliability and Security; 2007; 5 Pages; IEEE Computer Society.
Brassard et al.; Secret-Key Reconciliation by Public Discussion; Advances in Cryptology—EUROCRYPT '93; Jul. 13, 2001; pp. 410-423; vol. 765 of the series Lecture Notes in Computer Science; Springer Berlin Heidelberg.
Dohrmann et al.; Public-key Support for Collaborative Groups; 1st Annual PKI Research Workshop; Jul. 29, 2002; pp. 139-148.
Prasad et al.; Efficient Device Pairing using "Human-Comparable" Synchronized Audiovisual Patterns; Applied Cryptography and Network Security; 6th International Conference; Jun. 3-6, 2008; pp. 328-345; vol. 5037 of the series Lecture Notes in Computer Science; Springer Berlin Heidelberg.
Saxena et al.; Secure Device Pairing based on a Visual Channel; 2006 IEEE Symposium on Security and Privacy; May 21-24, 2006; 17 Pages.
Soriente et al.; BEDA: Button-Enabled Device Pairing; IACR Cryptology ePrint Archive; Jan. 2007; 7 Pages.
Laur et al.; Efficient Mutual Data Authentication Using Manually Authenticated Strings; Cryptology and Network Security; 5th International Conference; Dec. 8-10, 2006; pp. 90-107; vol. 4301 of the series Lecture Notes in Computer Science; Springer Berlin Heidelberg.
Balfanz et al.; Talking to Strangers: Authentication in Ad-Hoc Wireless Networks; NDSS Symposium 2002; Feb. 6, 2002; 13 Pages.
Bennett et al.; Quantum Cryptography; Public Key Distribution and Coin Tossing; IEEE International Conference on Computers, Systems and Signal Processing; Dec. 10-12, 1984; 5 Pages.
Cachin et al.; Linking Information Reconciliation and Privacy Amplification; Journal of Cryptology; 1997 International Association for Cryptologic Research; Mar. 1997; pp. 97-110; vol. 10, Issue 2; Springer-Verlag.
Dodis et al.; Fuzzy Extractors: How to Generate Strong Keys from Biometrics and Other Noisy Data; SIAM Journal on computing; Jan. 20, 2008; pp. 97-139; vol. 38.
Soriente et al.; HAPADEP: Human-Assisted Pure Audio Device Pairing; Information Security; 11th International Conference, ISC 2008; Sep. 15-18, 2008; pp. 385-400; vol. 5222 of the series Lecture Notes in Computer Science; Springer-Verlag Berlin Heidelberg.
Kindberg et al.; Validating and Securing Spontaneous Associations between Wireless Devices; Information Security; 6th International Conference, ISC 2003; Oct. 1-3, 2003; pp. 44-53; vol. 2851 of the series Lecture Notes in computer Science; Springer-Verlag Berlin Heidelberg.
Goodrich et al., Loud and Clear: Human-Verifiable Authentication Based on Audio; Distributed Computing Systems, 2006; 26th IEEE International Conference on Distributed Computing Systems; Jul. 4-7, 2006; 10 Pages.
McCune et al.; Seeing-Is-Believing: using camera phones for human-verifiable authentication; International Journal Security and Networks; Feb. 1, 2009; pp. 43-56; vol. 4.
Nakassis et al.; Expeditious Reconciliation for Practical Quantum Key Distribution; Quantum Information and Computation II; Aug. 24, 2004; 8 Pages; SPIE Proceedings vol. 5436.
Pasini et al.; SAS-Based Authenticated Key Agreement; 9th International Conference on Theory and Practice in Public Key Cryptography; Apr. 24-26, 2006; pp. 395-409; vol. 3958 of the series Lecture Notes in Computer Science; Springer Berlin Heidelberg.
Mayrhofer et al.; Shake Well Before Use: Authentication Based on Accelerometer Data; 5th International Conference Pervasive Computing; May 13-16, 2007; pp. 144-161; vol. 4480 of the series Lecture Notes in Computer Science; Springer-Verlag Berlin Heidelberg.
Roth et al.; Simple and Effective Defense Against Evil Twin Access Points; Wireless Network Security Conference (WiSec); Mar. 31-Apr. 2, 2008; pp. 220-235.
Holmquist et al.; Smart-Its Friends: A Technique for Users to Easily Establish Connections between Smart Artefacts; International Conference on Ubiquitous Computing (UbiComp); Oct. 2001; 6 Pages.
Uzun et al.; Pairing Devices for Social Interactions: A Comparative Usability Evaluation; ACM CHI Conference on Human Factors in Computing Systems; May 7-12, 2011; 10 Pages.
Perrig et al.; Hash Visualization: a New Technique to improve Real-World Security; International Workshop on Cryptographic Techniques and E-Commerce Conference, Oct. 1999; pp. 131-138.
Aljaafreh et al., An Evaluation of Feature Extraction Methods for Vehicle Classification Based on Acoustic Signals; 2010 International Conference on Networking, Sensing and Control (ICNSC); Apr. 10-12, 2010; pp. 570-575; IEEE, Chicago, IL, USA.
Diffie et al.; New Directions in Cryptography; IEEE Transactions on Information Theory; Nov. 1, 1976; pp. 344-654; vol. 22, Issue 6.
Uzun et al.; Usability Analysis of Secure Pairing Methods; Financial Cryptography and Data Security; 11th International Conference, FC 2007, and 1st International Workshop on Usable Security; Feb. 12-16, 2007; pp. 307-324; vol. 4886 of the series Lecture Notes in Computer Science; Springer Berlin Heidelberg.
Juels et al.; A Fuzzy Commitment Scheme; 6th ACM Conference on Computer and Communication Security; Nov. 1-4, 1999; pp. 28-36.
Linnartz et al.; New Shielding Functions to Enhance Privacy and Prevent Misuse of Biometric Templates; 4th International Conference on Audio- and Video-Based Biometric Person Authentication (AVBPA); Jun. 9-11, 2003; pp. 393-402; vol. 2688 of the series Lecture Notes in Computer Science; Springer Berlin Heidelberg.
Bloch et al.; LDPC-based Gaussian key reconciliation; Information Theory Workshop, 2006; Mar. 13-17, 2006; pp. 116-120. IEEE.

* cited by examiner

SYSTEM AND METHOD FOR SHARED KEY AGREEMENT OVER UNTRUSTED COMMUNICATION CHANNELS

FIELD

This disclosure relates generally to the fields of encrypted communication, and, more particularly, to systems and methods for generating shared cryptographic keys between two or more computing devices.

BACKGROUND

Cryptographically secure encryption and authentication schemes are vital to enabling secure communication between different parties over untrusted communication channels, such as the Internet and other wired and wireless data networks. As used herein, the term "untrusted communication channel" refers to any communication medium, including but not limited to wired and wireless data networks, where two or more computing devices exchange information that a potential attacker can monitor and potentially manipulate to compromise communication between the computing devices. For example, when computing device A owned by Alice and computing device B owned by Bob communicate via an untrusted network such as the Internet or another communication channel like a direct wireless channel or a wired connection that is tapped, an attacker Eve uses another computing device E to monitor the contents of the communication between A and B. In some instances, E can actively insert fabricated data into the untrusted communication channel to masquerade as A or B. As is known in the art, if A and B implement appropriate encryption and authentication processes, then their communications over the untrusted channel can be protected against E. When the communications are properly encrypted, E can read the encrypted data but is unable to produce the unencrypted contents in a practical manner. When the communications are properly authenticated, then A can identify if a communication that purports to be from B is either a fabrication or has been corrupted by E, and vice versa. Thus, proper cryptographic encryption and authentication enable A and B to communicate in a secure manner over what is otherwise an untrusted communication channel.

In most practical encrypted communications between two computing devices A and B, the two computing devices need to have a shared cryptographic key K that is known to both A and B, but is unknown to any third parties including the attacker E. Of course, public key infrastructure (PKI) cryptographic systems are an example of systems that do not include shared secret keys since A and B each keep a non-shared secret key and share a corresponding public key that is not kept secret. However, in most practical communications schemes that employ PKI, the public and private keys are used to form a secure channel to perform a shared-secret key-exchange protocol, such as the Diffie-Hellman or other suitable key exchange protocols, where the parties A and B use PKI to share a secret key with each other over an untrusted communication channel. The secret key is then used in conjunction with an appropriate symmetric encryption scheme, such as AES, to perform the bulk of the secured communications between A and B. Practical communication systems uses shared-secret keys even when PKI is in place for efficiency reasons since symmetric encryption schemes such as AES typically offer substantially higher performance than PKI encryption.

While PKI is one known method for sharing secret keys between parties over an untrusted channel, the existing PKI systems that are known to the art are also complex and can present difficulties in establishing communication between the computing devices of two parties A and B, especially when the communication is on an ad-hoc basis. Other methods that are known to the art for sharing secret keys between two devices A and B use what is referred to as an out-of-band (OOB) communication channel. The OOB communication channel is typically a separate communication channel from the usual communication channel that A and B use for communication. For example, if A and B typically communicate by email via the Internet or another data network, the OOB channel could be through a telephony network that the parties who operate devices A and B use to share a passphrase or other secret that is used to encrypt and authenticate email messages. A wide range of OOB communication schemes that include both physical communication (e.g. a courier carrying shared secrets on paper or a non-volatile memory device) and electronic communication through line-of-sight laser or infrared, short range radio, or short-range audio communications are known to the art. The OOB is often another untrusted channel that is potentially susceptible to attackers, but using the OOB to distribute the shared secret data typically increases the difficulty level for attackers and eliminates many practical forms of attack.

While using an OOB can help in distributing the shared secret keys when other schemes such as PKI are unavailable, using an OOB can also present challenges. Many manual OOBs, such as phone conversations, can make the exchange of lengthy cryptographically secure secrets difficult. Other automated OOBs often require two parties to be in close proximity to one another to be effective for short-range infrared, radio, or audio communication. Consequently, improved systems and methods for generating shared secret keys in a secure manner would be beneficial.

SUMMARY

In one embodiment, a method for generating shared secret cryptographic keys using an untrusted communication channel has been developed. The method includes generating with a first processor in a first computing device, error correction data corresponding to first sensor data that is stored in a first memory in the first device, generating with the first processor in the first computing device a first cryptographic key with reference to a first hashed value corresponding to the first sensor data, generating with the first processor in the first computing device a first message authentication code (MAC) with reference to the first cryptographic key and the error correction data, and transmitting with a first input/output (I/O) device in the first computing device the error correction data and the first MAC through a communication channel to a second computing device to enable the second computing device to generate a second cryptographic key in the second computing device with reference to second sensor data.

In another embodiment, a method for generating shared secret cryptographic keys using an untrusted communication channel has been developed. The method includes generating with a first processor in a first computing device a plurality of random words, each random word in the plurality of random words having a first predetermined number of bits, generating with the first processor in the first computing device a plurality of error correction words corresponding to the plurality random words using a predetermined encoding process, each error correction word having a second predetermined number of bits that is greater than the first predetermined number of bits in each of the random words, generating with the first processor in the first computing device randomized data with reference to the plurality of error correction words and to first sensor data that is stored in a first memory in the first device, generating with the first processor in the first computing device a first cryptographic key with reference to a first hashed value corresponding to the first sensor data, generating with the first processor in the first computing device a first message authentication code (MAC) with reference to the first cryptographic key and the randomized data, and transmitting with a first input/output (I/O) device in the first computing device the randomized data and the first MAC through a communication channel to a second computing device to enable the second computing device to generate a second cryptographic key in the second computing device with reference to second sensor data.

In another embodiment, a method for generating shared secret cryptographic keys using an untrusted communication channel has been developed. The method includes generating first sensor data with a first sensor in a first computing device, generating second sensor data with a second sensor in a second computing device, transmitting with a first input-output (I/O) device in the first computing device first error correction data corresponding to the first sensor data to the second computing device, transmitting with a second input-output (I/O) device in the second computing device second error correction data corresponding to the second sensor data to the first computing device, generating with a first processor in the first computing device third sensor data with reference to the first sensor data, the second error correction data, and a predetermined error reconciliation process, generating with a second processor in the second computing device the third sensor data with reference to the second sensor data, the first error correction data, and the predetermined error reconciliation process, generating with the first processor in the first computing device a cryptographic key with reference to a hashed value of the third sensor data, generating with the second processor in the second computing device the cryptographic key with reference to the hashed value of the third sensor data, and generating with the second processor in the second computing device encrypted data using the cryptographic key for encrypted and authenticated communication with the first communication device.

DETAILED DESCRIPTION

For the purposes of promoting an understanding of the principles of the embodiments described herein, reference is now be made to the drawings and descriptions in the following written specification. No limitation to the scope of the subject matter is intended by the references. This patent also includes any alterations and modifications to the illustrated embodiments and includes further applications of the principles of the described embodiments as would normally occur to one skilled in the art to which this document pertains.

As used herein, the term "sensor data" refers to any environmental data that are recorded by one or more sensing devices associated with a computing device to form the basis for generation of a cryptographic key. Examples of sensor data include, but are not necessarily limited to, photographic data of one or more objects that are generated by digital cameras or audio data that are generated by microphones or other sound recording devices. As described in more detail below, two or more different computing devices generate similar sets of sensor data that form the basis for a shared cryptographic key.

As used herein, the term "object" as used in conjunction with photographic data refers to any item, building, landscape, structure, or the like that can be identified and photographed by two or more parties in a repeatable manner. While the term object is typically used singularly below, a reference to "an object" does not necessarily require that the exact same object be present in the photographs of both parties. For example, a teapot 370 serves as an illustrative example of an object in FIG. 3. If the teapot is a mass-produced item, then photographs of two different teapots that share the same design can serve as the object. Additionally, a photograph could include an arrangement of multiple objects, such as items on a table or multiple buildings in a city.

As used herein, the term "registration" refers to a process for adjusting sets of sensor data in two different devices to reduce differences between the corresponding sets of sensor data. For example, a registration process for photographic sensor data includes adjustment of the relative position or scale of an object that is depicted in one photograph to correspond to the relative position and scale of the same object in another photograph. A registration process for two sets of audio data includes synchronization of the relative times at which the two audio recordings record a common set of sounds.

Figure 1:
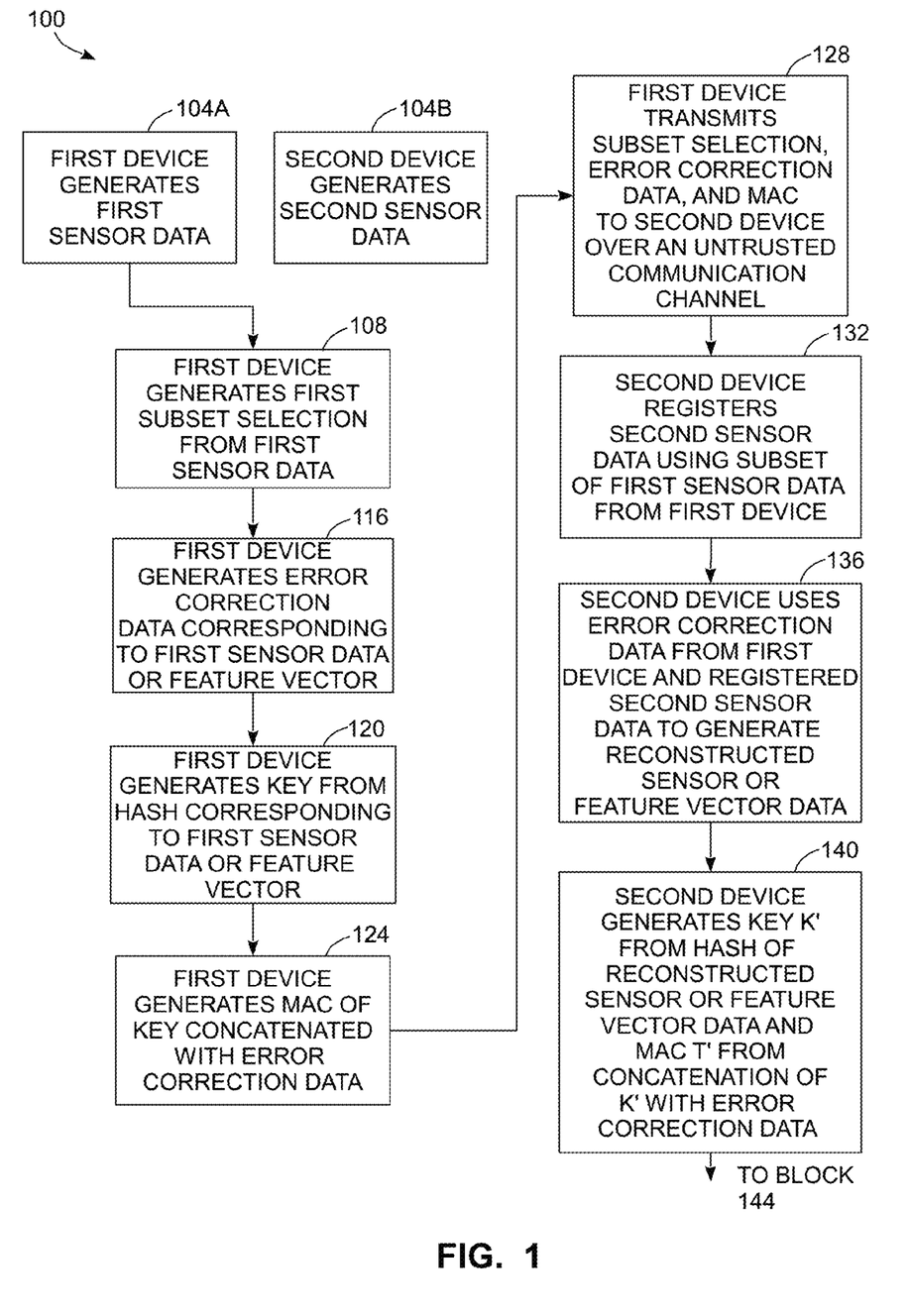
FIG. 1 is a block diagram of one embodiment of a process for generating shared cryptographic keys between two devices using two sets of sensor data.

FIG. 1 depicts a process 100 for generation of a shared cryptographic key between two computing devices. The process 100 is described in conjunction with the system 300 of FIG. 3 for illustrative purposes. In the discussion below, a reference to the process 100 performing and action or function refers to operation of one or more processors in computing devices that execute stored program instructions to perform the function or action in conjunction with other components in the computing devices.

Process 100 begins with generation of multiple sets of photographic data of a common object by two or more computing devices. In the illustrative example of FIG. 1, a first computing device 304 generates first photographic data of the object (block 104A) and a second computing device 344 generates second photographic data of the object (block 104B). In the first computing device 304, the processor 308 stores the first photographic data in the memory 312, and the second processor 348 stores the second photographic data in the memory 352 in the second computing device 344. In another embodiment, the first computing device 304 records audio data from a sound source 390 using the microphone 322 and the processor 308 stores the first audio data in the memory 312. In the second computing device 344, the second microphone 362 records the audio from the source 390 and the second processor 348 stores the second audio data in the memory 352. The generation of photographic data by the computing devices is an optional portion of the process 100. In alternative embodiments, the computing devices merely receive photographic data of an object that have been generated by a separate device, such as a separate digital camera. For example, two computing devices could retrieve a digital photograph of an object from a website, or similar, but not identical, photographs of the object from two or more different websites.

Prior to commencing process 100, the two or more parties that own the computing devices agree to produce photographs of common objects that are used as the basis for generation of shared cryptographic keys. The agreement on the objects that serve as the photographs typically occurs in an OOB communication. The two parties may be in the same physical location and agree to photograph one or more objects in a direct conversation, or may use another OOB communication process that does avoids the untrusted communication channel 380 to agree on the objects that are photographed. The digital photographs that are generated during the blocks 104A and 104B are visually similar, but are typically not identical to each other on a pixel by pixel basis. The parties agree to photograph the object from similar angles under similar lighting conditions. Additionally, the generation of the photographic data optionally includes additional techniques such as desaturation (e.g. converting a color photograph to a two-level black-and-white or a multi-level grayscale photograph), scaling both images to a common resolution, cropping or otherwise removing background portions of the images, and other image processing operations that simplify an error correction process for reconstructing one of the photographs from the other photograph and a set of error correction code data. In another embodiment, the two parties agree to record similar sets of audio data that form the basis for generating the shared keys using an OOB communication channel.

Figure 3:
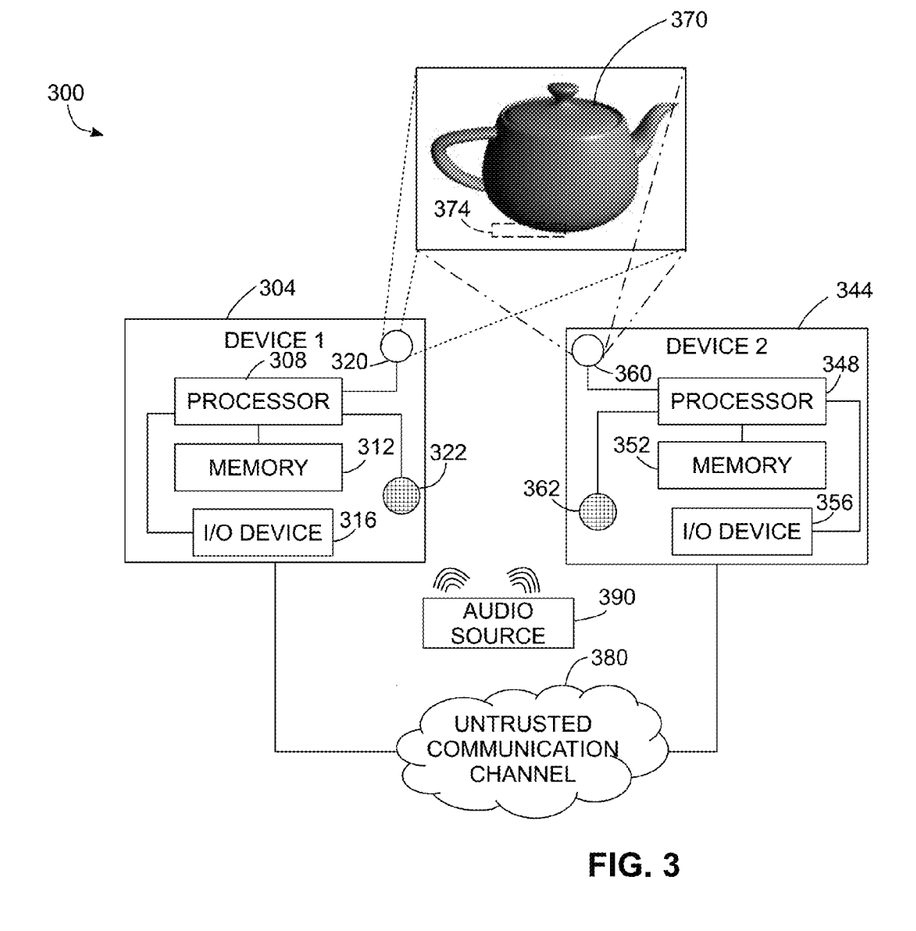
FIG. 3 is a diagram of a communication system that includes two or more computing devices that generate shared cryptographic keys based on multiple sets of sensor data.

FIG. 3 depicts the generation of sensor data for two computing devices that use the sensor data for the generation of shared cryptographic keys in a system 300 in more detail. In FIG. 3, two computing devices 304 and 344 generate shared cryptographic keys during the process 100. The computing device 304 includes a processor 308 that is operatively connected to a memory 312, input/output (I/O) device 316, camera 320, and a microphone 322. The processor 308 is, for example, a single digital logic device or multiple digital logic devices that implement the functionality of a central processing unit (CPU), graphical processing unit (GPU), and other functional units that enable control of the first computing device 304. In some embodiments the functionality of the processor 308 and one or more of the other components are integrated into a system on a chip (SoC). The memory 312 includes both volatile memory device such as random access memory (RAM) and non-volatile memory devices such as solid state, magnetic, and optical storage devices. The memory 312 stores programmed instructions for execution by the processor 308, photographic data including the images of one or more objects, and data that are associated with a shared secret cryptographic key that is exchanged with the second computing device 344. The I/O device 316 is a communication device that is incorporated into the first computing device 304 to enable the first computing device 304 to transmit and receive data with the second computing device 344 through an untrusted communication channel 380. Common examples of the I/O device 316 include wireless transceivers that communicate through wireless local area networks (WLANs) or wireless wide area networks (WWANs), short-range wireless devices such as Bluetooth and wireless USB, wired networking including Ethernet, and any other suitable communication device that accesses an untrusted communication channel. The camera 320 is a digital camera that is configured to generate digitized photographic data of objects, including the object 370, which is depicted as a tea pot for illustrative purposes in FIG. 3. Some computing devices omit the camera 320 and receive the photographic data of an object through another embodiment such as a memory device that stores photographs generated by a separate digital camera or from another source such as a website or other network service that stores the photographic data. The microphones 322 and 362 are configured to record sounds from an environment around the computing devices 304 and 344, respectively. In the illustrative embodiment of FIG. 3, the microphones 322 and 362 each record sounds from an audio source 390.

For illustrative purposes, the second computing device 344 is configured in a similar manner to the first computing device 304, with the second computing device 344 incorporating a second processor 348, second memory 356, second I/O device 356, second camera 360, and second microphone 362. In some embodiments, the computing devices 304 and 344 are mobile electronic devices that are embodied as smartphones, tablets, notebook PCs, wearable computers, and the like.

In one configuration that is illustrated in FIG. 3, the first computing device 304 and second computing device 344 generate the sensor data as photographic data of an object. In the example depicted in FIG. 3, the computing device 304 generates first photographic data of the teapot object 370 with the camera 320 and the computing device 344 generates second photographic data of the teapot object 370 with the camera 360. The photographs can be taken at different times prior to the remaining portion of the process 100. As described above, in some embodiments the object is a mass-produced item where the first computing device 304 can take a photograph of one copy of the teapot 370 while the second computing device 344 takes another photograph of another copy of the teapot 370. In other situations, the computing devices take photographs of a single object, such as a landmark or other fixed object that remains substantially unchanged over the time when the computing devices generate photographs of the object.

In another configuration that is illustrated in FIG. 3, the first computing device 304 and second computing device 344 generate sensor data corresponding to the output of an audio source 390. The audio source 390 is, for example, an audio playback device that includes speakers to reproduce a predetermined musical piece or spoken audio, while in another embodiment the audio source 390 is a person who speaks or sings within recording range of the microphones 322 and 362 in the first and second computing devices 304 and 344, respectively. As described in more detail below, in some configurations the audio source generates a predetermined tone or other predetermined sound that is easily identified by the processors 308 and 348. The predetermined sound is used for time registration between the first audio data that are recorded by the first computing device 304 and the second audio data that are generated by the second computing device 344.

Referring to the process 100 of FIG. 1 and the computing devices of FIG. 3, the first computing device 304 optionally generates a first subset selection from the first sensor data (block 108). When the first sensor data includes photographic data, the processor 308 selects the subset from a comparatively small portion of the first photographic data (e.g. 10%-20%) and the subset includes a feature from the first photograph that serves as a point of reference for registering the object in the second photograph in the second computing device with the relative size and location of the object in the first computing device. The selected subset often includes a portion of the object that does not include easily recognizable features or elements that would provide sufficient information for an attacker to duplicate the photograph of the object. For example, in FIG. 3 the first computing device 304 selects the subset image 374 that includes a portion of the base of the teapot 370.

During process 100, the first computing device 304 transmits the data for the selected subset of photographic data 374 along with coordinates specifying where the subset is located in the first photographic data to the second computing device 344. In the configuration where the sensor data include an audio recording, the first computing device 304 optionally transmits the predetermined reference sound and a timestamp corresponding to when the reference sound was recorded to the second computing device 344 for use in time registration of the second audio data. As described below, the second computing device 344 uses the registration data from the first computing device 304 to adjust the relative size and position of the object in the second photographic data or to synchronize the timing of the second audio data relative to the first audio data to reduce differences between the first and second sets of sensor data. The selected subset of the photographic or audio sensor data is small enough to make identification of the object in the first photograph or audio in the first audio recording difficult for an attacker who may monitor the untrusted communication channel 380. Additionally, in some embodiments the selected subset of the first photograph or audio recording that is used for registration is not used for generation of the cryptographic keys in the first and second computing devices.

Process 100 continues as the first computing device 304 generates error correction data corresponding to the first sensor data that are stored in the memory 312 (block 116). In one embodiment, the processor 308 executes stored instructions to generate error correction data C using Reed-Solomon encoding, LDPC codes, or any other error correction process that is suitable for use with sensor data such as photographic or audio data. In another embodiment, the processor 308 executes the stored instructions to generate error correction data C for a feature vector V that corresponds to the first sensor data. The first processor 308 also generates a cryptographic key K by performing a hash function on the first photographic data (hash (I)) to generate a hashed value with a predetermined number of bits using a cryptographically secure hashing function (block 120). Examples of suitable hash functions for generation of the key K include the SHA-2 and SHA-3 families of hash functions that generate hashed values with lengths of 256-512 bits. Other suitable hash functions include universal hash functions, where any two different inputs (keys) produce the same output, which is referred to as a "collision" with a maximum probability of $$\frac{1}{m}$$

when the hash function generates a total of m distinct outputs (e.g. $m=2^{256}$ or $m=2^{512}$). Other hash functions are referred to as $\epsilon$-universal when the maximum probability of collision is $$o\left(\frac{1}{m}\right).$$

The cryptographic key K is a cryptographic key that is not transmitted from the first computing device 304. As described below, the second computing device 344 reconstructs the photographic data from the first photograph in the first computing device 304 and regenerates a cryptographic key K' that matches the cryptographic key K if the reconstructed photographic data match the first photographic data in the first computing device 304. The processing of blocks 108-120 to optionally select a subset of the first photographic data, generate error correction data, and generate the key K can occur in any order or concurrently depending upon the configuration of the first computing device 304.

In another embodiment, the first computing device 304 generates the key K from a first feature vector V that is generated from the first sensor data. If the sensor data include photographic data, the first feature vector V is generated using one or more feature extraction techniques including, but not limited to, edge detection, image segmentation, thresholding, and the like. Different feature extraction techniques are also applicable to audio data. In one embodiment, the feature vector V is a one-dimensional vector with a predetermined number of entries. Each entry in the feature vector V includes a plurality of numerical descriptors corresponding to the sensor data. The key K is generated from the numerical entries in the feature vector V instead of being generated directly from the photographic data. As described in more detail below, the second computing device generates a second feature vector V' from the second photographic data and the second computing device uses the error correction data C to modify the second feature vector V' to match the first feature vector V if the two feature vectors are sufficiently similar to each other. Using feature vectors that are generated with reference to the first and second photographic data for generation of the cryptographic keys instead of using the photographic data directly.

Process 100 continues as the first computing device 304 generates a message authentication code (MAC) T from the cryptographic key K and the error correction code data C (block 124). In one configuration the processor 308 executes stored program instructions to concatenate the key K with the error correction code data C and generate the MAC T using a cryptographically secure hashing function T=MAC (K, C). The cryptographically secure hashing function can be the same hashing function that generates the key K, but in order to reproduce the MAC T, the second computing device needs to have the same error correction data C, which are transmitted in an unencrypted format, and the same cryptographic key K, which the second computing device regenerates using an optional registration process, the error correction data C and the second sensor data that are stored in the memory 352.

During process 100, the first computing device 304 transmits the optional subset of the sensor data, error correction data C, and MAC T to the second computing device 334 through the untrusted communication channel 380. As described above, the untrusted communication channel 380 is susceptible to eavesdropping and tampering by attackers, so any data that transmitted through the channel 380 are considered to be publicly known. As described below, while attackers can view the data that are transmitted from the first computing device 304, the MAC T enables the second computing device 344 to determine if an attacker tampers with the data or attempts to fabricate a message that purports to be from the first computing device 304. The first computing device 304 can transmit the data using a wide range of methods including, but not limited to, direct TCP/IP or UDP/IP connections to the second computing device 344, email, posting to a public website, and any other suitable transmission method. The second computing device receives the optional subset of sensor data, error correction data C, and MAC T from the first computing device.

Process 100 continues with an optional audio or photographic sensor data registration process in the second computing device 344 (block 132). In one embodiment, the second computing device 344 receives a portion of the audio data from the first computing device 304 in association with a timestamp for when the first computing device 304 recorded the audio data. For example, the second audio device 344 may receive a brief recording of a predetermined tone and a timestamp of "00:03," which indicates that the first audio device first recorded the tone at 3 seconds into the first recording. The second processor 348 identifies the presences of the same predetermined tone in the second audio recording and uses the timestamp from the first computing device 344 to identify a relative time offset between the first audio recording and the second audio recording. For example, if the second processor 348 identifies that the predetermined tone occurs at 5 seconds into the second recording, then the processor 348 identifies a relative time offset of −2 seconds between the first audio recording and the second audio recording. The second processor 348 uses the time offset during an error correction process to synchronize the relative times of the first and second audio recordings during application of the error correction data from the first computing device 344 to the second recorded audio data.

In another embodiment where the second computing device 344 receives the subset of the first photographic image from the first computing device 304, the second processor 348 executes program instructions to register the second photographic data that are stored in the second memory 352 with the subset of the first photographic data that are received from the first computing device 304. The registration process includes one or both of a realignment of the second photographic data to match the corresponding subset of the first photographic image data and resizing of the second photographic data to match the scale of the object in the first photographic data. In one embodiment, the second computing device performs feature extraction techniques that are known to the art to identify the corresponding features in the second photographic data to the features in the subset of image data from the first computing device 304 to perform the registration process.

Figure 4:
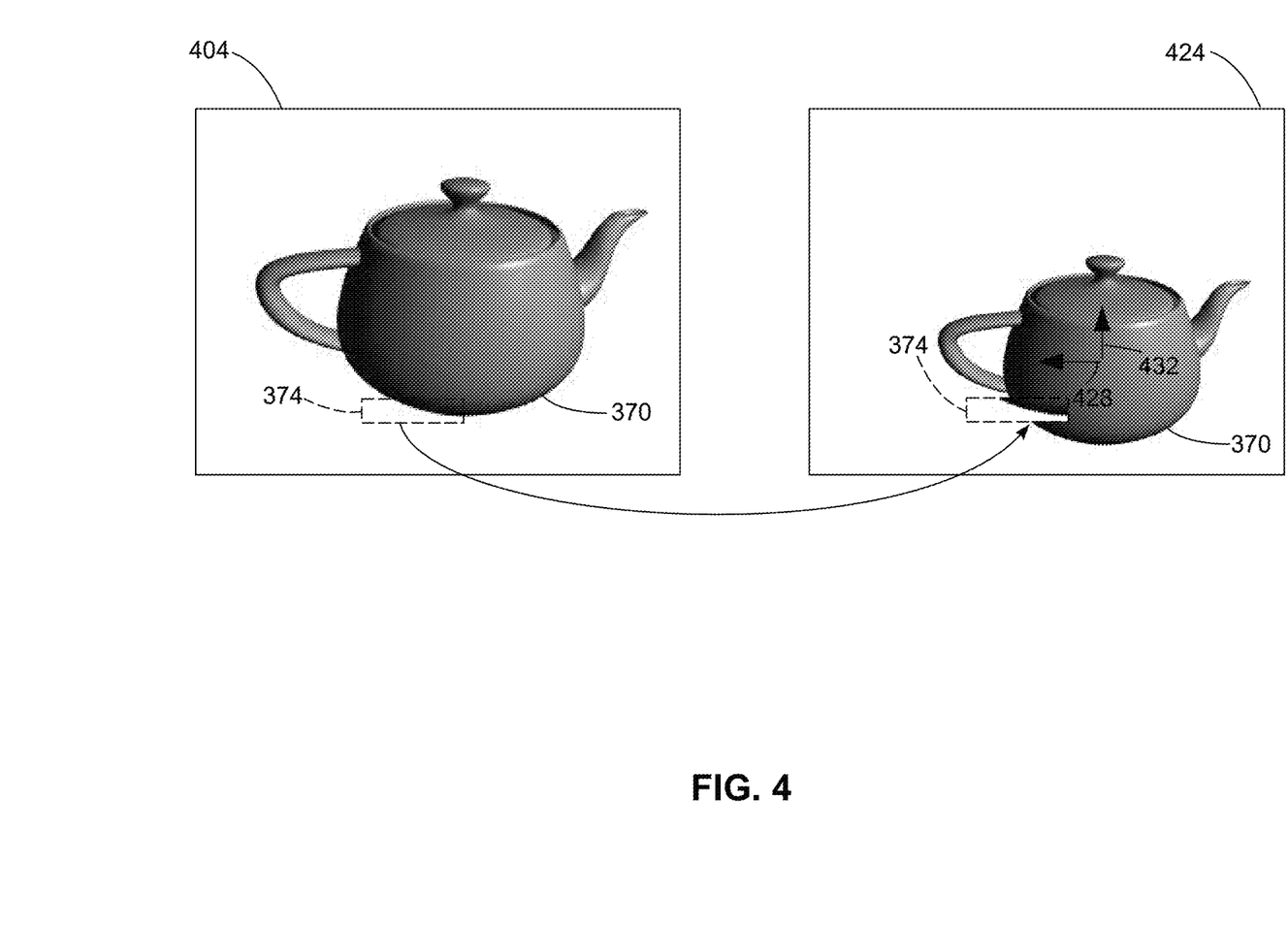
FIG. 4 is a diagram depicting registration of an object in photographic data stored in a second computing device based on a subset of first sensor data that is transmitted from a first computing device.

FIG. 4 depicts an example of the registration process. The first photographic data 404 includes the teapot 370 and the subset image data 374 that the second computing device 344 receives from the first computing device 304. The second computing device 344 processes second photographic image data 424 that includes the teapot 370, but the teapot 370 in the second photographic data 424 is located in different x and y coordinates and appears with a different size than in the first photographic data 404. The second processor 348 rescales the size of the teapot 370 and translates the location of the second teapot 370 as indicated by the arrows 428 and 432 to register the teapot 370 in the second photographic data 424 with the teapot 370 in the first photographic data 404. The registration process increases the likelihood that the error correction data from the first computing device 304 can be used to generate reconstructed photographic data that match the first photographic data that are stored in the memory 312 of the first computing device 304 and are not transmitted directly to the second computing device 344.

Referring again to FIG. 1, process 100 continues as the second computing device 344 generates reconstructed photographic data using the error correction data C from the first computing device 304 and the second photographic data of the object (block 136). In embodiments where the second computing device 344 performs the registration process, the second photographic data refers to the registered photographic data, and in other embodiments that omit the registration process the second computing device 344 applies the error correction data to the second photographic data directly. If the second photographic data of the object are sufficiently similar to the first photographic data, then the reconstructed photographic data match the first photographic data. Larger errors that prevent reconstruction of the first photographic data or false correction data or MAC data that are supplied by an attacker prevent the second computing device 344 from generating a cryptographic key that matches the key K in the first computing device 304. In an embodiment where the first computing device 304 generates the key K with reference to a feature vector that is corresponds to the first image data, the second computing device 344 also performs the feature extraction process on the second photographic data to generate a second feature vector V' and the second computing device 344 performs an error correction process on the section feature vector V' with the correction data C from the first computing device 304 to reconstruct the feature vector V from the first computing device 304.

Process 100 continues as the second computing device 344 generates a second cryptographic key K' from the reconstructed sensor data or the reconstructed feature vector and verifies if the second cryptographic key K' matches the first cryptographic key K. To regenerate the second cryptographic key K', the processor 348 in the second computing device executes stored program instructions to generate another hash of the reconstructed image data using the same hash function that is used in the first computing device 304, and the second computing device 344 generates another MAC T' from the key K' and the error correction data (T'=MAC(K',C)) (block 140). If the reconstructed photographic data in the second computing device 344 match the first photographic data in the first computing device 304, then the corresponding hashed value of the cryptographic key K' matches the cryptographic key K. Of course, the second computing device 344 does not have direct access to the first cryptographic key K. However, the second MAC T' matches the first MAC T if and only if the second key K' also matches the first key K. Consequently, if T matches T' (block 144), then the second computing device 344 uses the key K' to initiate an authentication process to establish authenticated and encrypted communications with the first computing device 304 through the untrusted communication channel 380 (block 148). If, however, T does not match T' (block 144), then the second device rejects K' (block 152). The two devices 304 and 344 optionally attempt to perform the process 100 again with different photographic data to establish matching shared secret cryptographic keys.

While process 100 is described above for generation of a shared cryptographic key between two computing devices, the process 100 can be extended to generation of shared cryptographic keys that are shared by three or more computing devices where all of the computing devices store similar sets of sensor data and share the error correction data through the untrusted communication channel 380. While the description above uses a single photograph of an object or audio recording as the basis for generation of the shared secret cryptographic key, in alternative embodiments a set of two or more photographs, audio recordings, or a combination of photographs and audio recordings are used to generate the cryptographic key. For example, in one configuration the first computing device 304 concatenates the data for each of a first set of N photographs in a predetermined order and hashes the concatenated data to generate the key K from a combination of the photographs. The first computing device 304 transmits the key K, error correction data $C_1$-$C_N$ for each of the N photographs, and the MAC to the second computing device 344. The second device stores a second set of photographs that correspond to the first set of photographs in the first device and generates the reconstructed key K' from the error correction data and the second set of photographs.

Figure 2:
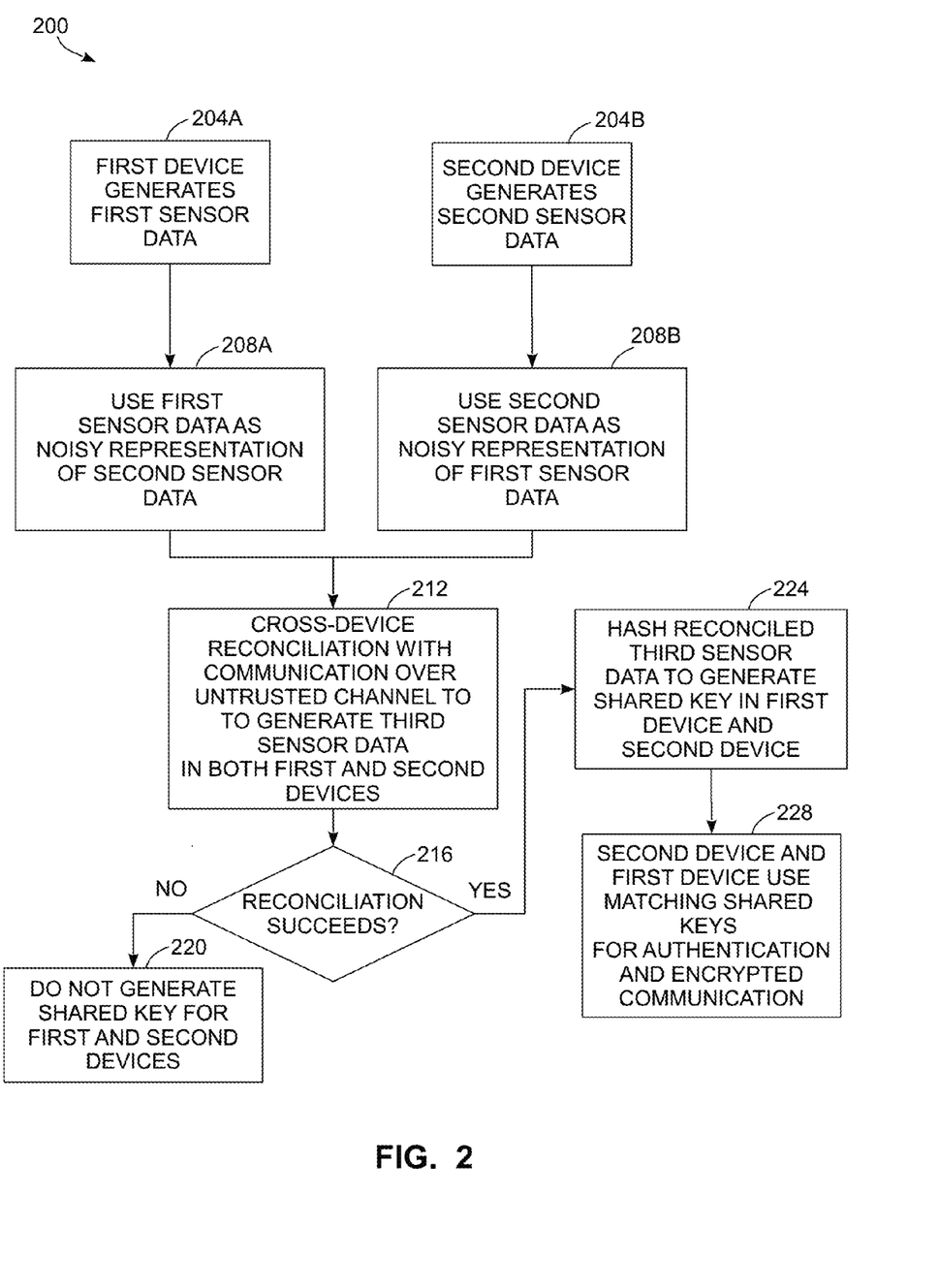
FIG. 2 is a block diagram of another embodiment of a process for generating shared cryptographic keys between two devices using two sets of sensor data.

FIG. 2 depicts another process 200 for generation of a shared cryptographic key between two computing devices. The process 200 is described in conjunction with the system 300 of FIG. 3 for illustrative purposes. In the discussion below, a reference to the process 200 performing and action or function refers to operation of one or more processors in computing devices that execute stored program instructions to perform the function or action in conjunction with other components in the computing devices.

Process 200 begins with generation of first sensor data in the first computing device (block 204A) and second sensor data in the second computing device (block 204B). The first computing device 304 and second computing device 344 perform the processing of blocks 204A and 204B in the same manner as described above with regards to blocks 104A and 104B, respectively, in the process 100 to generate photographic data of an object or audio data from an audio source. The first computing device 304 uses the first sensor data as a basis for a noisy representation of the second sensor data in the second computing device 344 (block 208A). That is to say, the first processor 308 in the first computing device begins a reconciliation process to transform the first sensor data with the differences between the first sensor data and the second sensor data, which are unknown to the first processor 308, being treated as noise. Similarly, the second processor 348 in the second computing device 344 uses the second sensor data as a basis for a noisy representation of the first sensor data in the first computing device (block 208B).

During process 200, the first computing device 304 and the second computing device 344 perform a reconciliation process that generates a third set of sensor data in both the first computing device 304 and the second computing device 344 (block 212). During the reconciliation process, the first computing device 304 and second computing device 344 exchange data through the untrusted channel 380. However, the data that are sent through the channel 380 do not enable a passive attacker to identify the contents of the first sensor data, the second sensor data, or the third sensor data. During the reconciliation process, both of the electronic devices 304 and 344 transmit data corresponding to the first sensor data and second sensor data, respectively, to enable both of the electronic devices to generate the third photographic data. In another embodiment, the first device 304 and second device 344 perform a feature extraction process to generate first and second feature vectors that correspond to the first and second photographic data, respectively. The first device 304 and second device 344 then perform the reconciliation process to generate a third feature vector that is common to both devices instead of attempting to regenerate a third feature vector that corresponds to the sensor data.

Examples of reconciliation processes that are known to the art include the Shell, CASCADE, and low-density parity-check (LDPC) code-based protocols. For example, during one embodiment of a reconciliation protocol, the first device selects a block of photographic data or a portion of the feature vector for the first sensor data and generates first parity data of the selected block. The first device 344 transmits the parity data to the second device 344 and the first device 304 receives second parity data from the second device 344 that correspond to the same selected block of data that was generated in the second device 344. If the parity data indicate that the two blocks of data match, then the first and second devices agree on a portion of the sensor data or feature vector. If, however, the parity values indicate that the two blocks of data do not match, then the electronic devices 304 and 344 perform a binary search process to identify and correct the specific errors between subsets of the blocks. The reconciliation process continues in an iterative manner until both of the electronic devices 304 and 344 have a third set of sensor or feature vector data that form the basis for generation of a shared key or the reconciliation process fails if the number of errors between the first and second electronic devices indicates that the underlying sensor data are too dissimilar from each other.

The reconciliation process generates the third sensor data or feature vector in both the first and second computing devices that is different than either of the first or second sets of sensor data. The reconciliation process has predetermined parameters that identify the maximum relative noise levels, which correspond to the differences between the first and second photographic data, to identify if the reconcile third photographic data corresponds to both the first photographic and the second photographic data with an acceptable noise level. If the reconciliation process succeeds (block 216), then both the first computing device and the second computing device generate a cryptographically secure hashed value of the third photographic data or third feature vector to generate the shared cryptographic key K that is known only to the first computing device and the second computing device (block 224). The first computing device 304 and the second computing device 344 uses the shared cryptographic key K to initiate an authentication process to establish authenticated and encrypted communications with the first computing device 304 through the untrusted communication channel 380 (block 228). If the noise levels between the original first and second sensor data or feature vectors and the reconstructed third photographic data or feature vector exceed a predetermined maximum level, then the reconciliation process fails in situations where either the first and second sets of sensor data do not depict the same object or audio source or when an attacker attempts to manipulate the reconciliation data without having a similar set of sensor data. If the reconciliation process fails (block 216), then the first computing device 304 and second computing device 344 do not generate a cryptographic key (block 220) and the computing devices optionally repeat the process 200 using different sets of sensor data to generate the shared key.

While the process 200 is described in conjunction with a shared key generation process that is based on sensor data that are generated by the two different electronic devices, the process 200 can also be extended to shared key generation that is based on multiple sets of sensor data, such as multiple photographs, audio recordings, or a combination of photographs and audio recordings. If the reconciliation process succeeds for some sets of sensor data but fails for other sets of sensor data, the two devices can retain the reconciled data for the successful sets of sensor data while running another reconciliation process for photographs or audio recordings that do not produce a successfully reconciled result. For example, if the two electronic devices generate a shared key based on three different photographs, then the two devices perform the reconciliation process described above separately for each set of photographs. In one instance, if the reconciliation process succeeds for two sets of the photographs but fails for the third set of photographs, then the two devices can select another set of photographs for the reconciliation process to form the basis for a shared key in conjunction with the two successful photograph sets.

Figure 5:
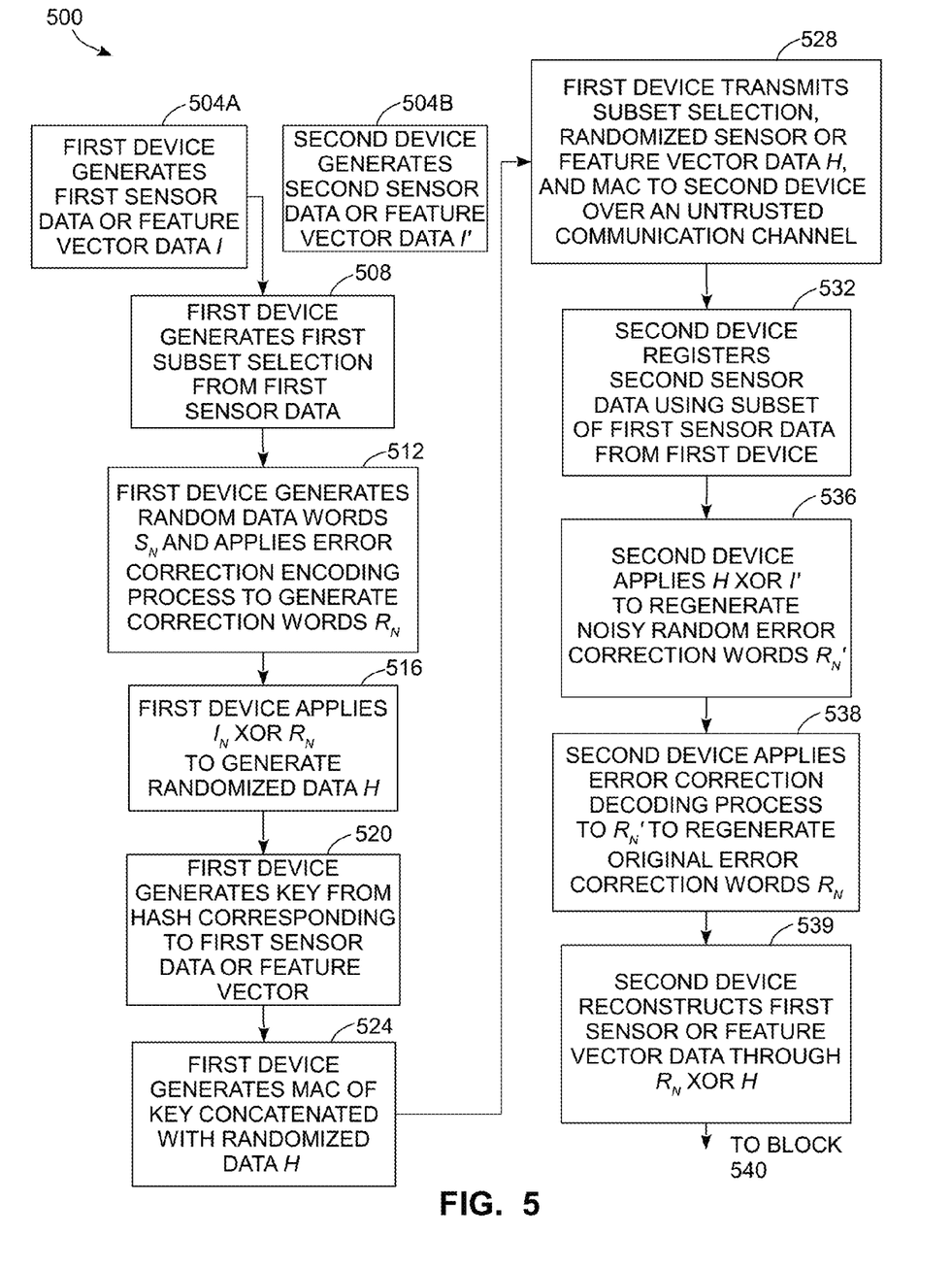
FIG. 5 is a block diagram of another embodiment of a process for generating shared cryptographic keys between two devices using two sets of sensor data.

FIG. 5 depicts another process 500 for generation of a shared cryptographic key between two computing devices. In the discussion below, a reference to the process 500 performing and action or function refers to operation of one or more processors in computing devices that execute stored program instructions to perform the function or action in conjunction with other components in the computing devices. As described below, some portions of the process 500 are performed in a similar manner to corresponding portions of the process 100. The process 500 is described in conjunction with the system 300 of FIG. 3 for illustrative purposes.

During process 500, the first computing device 304 generates first sensor data (block 504A) and the second computing device 344 generates second sensor data (block 504B). The two computing devices 304 and 344 generate similar sets of sensor data such as photographs of an object or audio recordings from a common audio source in a similar manner to the processing described above with reference to blocks 104A and 104B in the process 100. As described above, in some embodiments the first computing device 304 and the second computing device 344 perform a feature extraction process to generate first and second feature vectors, respectively, that are used for key generation instead of using the sensor data directly. Additionally, during process 500, the first computing device 304 optionally selects a subset of the first sensor data for transmission to the second computing device 344 for registration of photographic or audio data sensor data in a similar manner to the processing described above with reference to block 108 in the process 100 (block 508).

Process 500 continues as the first computing device 304 generates a plurality of S random data words and applies an error correction encoding process to produce another set of R error correction words that are based on the S random data words.(block 512). The S random data words are random numbers with a predetermined number of bits (e.g. 96 bits) that form the basis for generation of the R error correction words. In the first computing device 304, the processor 308 performs a predetermined error correction encoding process using each of the S random data words as input to generate each of the R error correction words with a predetermined level of information redundancy. For example, in one embodiment each of the S random data words includes 96 bits of data and the processor 308 generates the corresponding R error correction words each including 128 bits of data. The additional 32 bits of data in each of the R error correction words represent redundant information that is present in each error correction word to assist in regenerating the error correction word R from a noisy representation of the error correction word R'. As described in more detail below, the second sensor data I' in the second device 344 forms the basis for generating R' that is similar to, but typically not identical to, R. The number of bits of redundant data affects the ability of an error correction decoding process to regenerate the original error correction word R from the noisy representation R' where "noise" refers to the bits in R' that do not match the corresponding bits in R. A greater degree of redundancy increases the ability of the error correction decoding process to regenerate R from R' with a larger number of errors. However, in the process 500, too much redundancy might enable reconstruction of R' from a set of unrelated sensor data. Consequently, during process 500 the first computing device 304 generates the error correction words R with a predetermined number of redundant bits to enable error correction while still requiring that the reconstructed data R' be generated from sensor data I' that is sufficiently similar to the first sensor data I.

As described above, each of the error correction words R is generated with a predetermined length (e.g. 128-512 bits), and the first computing device generates a number of the error correction words $R_N$ that corresponds to the total number of bits in the first sensor data or first feature vector. The processor 308 executes stored instructions to perform an exclusive-or (XOR) between the error correction word R and the first sensor data or feature vector data I ($I_N$XOR $R_N$) to generate randomized photographic data H (block 516). Since many sets of sensor data include many more bits than are present in the error correction word R, the first computing device generates a plurality of N different error correction words $R_N$ that correspond to N different segments of the image data $I_N$ to ensure that each error correction word $R_{iEN}$ is XORed with only one portion of the image data and is never re-used. The first computing device transmits the randomized sensor data H to the second computing device.

The process 500 continues as the first computing device 304 generates a cryptographic key K using a cryptographically secure hash function applied to either the first sensor data or feature vector data (block 520). The first computing device 304 also generates a MAC for the key K and the randomized sensor or feature vector data H: T=MAC(K,H) (block 524). The first computing device 304 transmits the optional selected subset of the sensor data, randomized sensor or feature vector data, error correction data for the error correction words, and the MAC T to the second computing device 344 (block 528).

During process 500, the second computing device 344 optionally registers the second sensor data based on the subset of the first data that is received from the first computing device 304 (block 532). For example, the second computing device performs scaling and repositioning of the second photographic data to correspond to the first photographic data or synchronizes the playback time of second audio data with the first audio data based on registration data that are received from the first computing device.

During process 500, the second computing device uses the encrypted sensor or feature vector data to generate the noisy version $R_N'$ of the error correction words $R_N$ by applying an XOR operation of the corresponding N segments of the second sensor data $I_N'$ to the randomized data H: $R_N+e_N=I'$XOR H (block 536). If the second sensor data I' are similar enough to the first sensor data I, then the resulting noisy error correction words $R_N'$ are similar enough to the original error correction words $R_N$ to enable the second computing device 344 to apply the error correction decoding process to regenerate the original error correction words $R_N$ based on the redundant information that is encoded in the noisy error correction words $R_N'$ (block 538).

The second computing device 344 subsequently uses $R_N$ to reconstruct the first sensor or feature vector data I (I=$H_N$ XOR $R_N$) (block 539) and subsequently generates the shared key K' and another MAC T' from the first sensor or feature vector data I in the same manner as in the first computing device 304 (K'=hash (I); T'=MAC (K', H)) (block 540).

During the process 500, if the shared key K' that is generated in the second computing device 344 matches the original key K in the first computing device 304, then T=T' (block 544) and the first computing device 304 and second computing device 344 use the shared cryptographic keys K and K', which are identical keys stored in the memories of the device 304 and 344, respectively, to establish an authenticated and encrypted communication channel through the untrusted communication channel 380 (block 548). If, however, the shared key K' does not match K, then the MAC T does not match T', and the second computing device 344 rejects the key K' (block 552). The computing devices 304 and 344 optionally perform the process 500 again using different sets of sensor to establish another set of shared keys.

While process 500 is described above for generation of a shared cryptographic key between two computing devices, the process 500 can be extended to generation of shared cryptographic keys that are shared by three or more computing devices where all of the computing devices store similar sets of sensor data and share the error correction data through the untrusted communication channel 380. While the description above uses a single photograph of an object or audio recording as the basis for generation of the shared secret cryptographic key, in alternative embodiments a set of two or more photographs, audio recordings, or a combination of photographs and audio recordings are used to generate the cryptographic key. For example, in one configuration the first computing device 304 concatenates the data for each of a first set of N photographs in a predetermined order and hashes the concatenated data to generate the key K from a combination of the photographs. The first computing device 304 transmits the randomized photographic data H for all of the N photographs, and the MAC to the second computing device 344. The second device stores a second set of photographs that correspond to the first set of photographs in the first device and generates the reconstructed key K' from the randomized photographic data H and the second set of photographs.

It will be appreciated that variants of the above-described and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. A method for generating cryptographic keys comprising:
   generating with a first processor in a first computing device, error correction data corresponding to first sensor data that is stored in a first memory in the first device;
   generating with the first processor in the first computing device a first cryptographic key with reference to a first hashed value corresponding to the first sensor data;
   generating with the first processor in the first computing device a first message authentication code (MAC) with reference to the first cryptographic key and the error correction data; and
   transmitting with a first input/output (I/O) device in the first computing device the error correction data and the first MAC through a communication channel to a second computing device to enable the second computing device to generate a second cryptographic key in the second computing device with reference to second sensor data.

2. The method of claim 1 further comprising:
   receiving with a second I/O device in the second computing device the error correction data and the first MAC from the first computing device through the communication channel;
   generating with a second processor in the second computing device reconstructed sensor data corresponding to the first sensor data by performing a predetermined error correction process with the error correction data and second sensor data stored in a second memory of the second computing device;
   generating with the second processor in the second computing device the second cryptographic key with reference to a second hashed value corresponding to the reconstructed sensor data;
   generating with the second processor in the second computing device a second MAC with reference to the second cryptographic key and the error correction data; and
   generating with the second processor in the second computing device encrypted data using the second cryptographic key for encrypted and authenticated communication with the first communication device using the first cryptographic key only in response to the second MAC matching the first MAC.

3. The method of claim 2 further comprising:
   generating with a first camera in the first computing device the first sensor data as first photographic data of an object; and
   generating with a second camera in the second computing device the second sensor data as second photographic data of the object.

4. The method of claim 3 further comprising:
   transmitting with the first I/O device in the first computing device a subset of the first photographic data to the second computing device through the communication channel;
   receiving with the second I/O device in the second computing device the subset of the first photographic data from the first computing device through the communication channel;
   registering with the second processor in the second computing device the second photographic data with reference to the subset of the first photographic data to generate registered second photographic data, at least one of a relative position and size of the object in the registered second photographic data being different than in the second photographic data; and
   generating with the second processor in the second computing device the reconstructed photographic data by performing the predetermined error correction process with the error correction data and the registered second photographic data.

5. The method of claim 2 further comprising:
   generating with a first audio recording device in the first computing device the first sensor data as first audio data of sound in an environment around the first audio device; and
   generating with a second audio recording device in the second computing device the second sensor data as second audio data of the sound in the environment around the second audio device.

6. The method of claim 5 further comprising:

transmitting with the first I/O device in the first computing device a subset of the first audio data to the second computing device through the communication channel;

receiving with the second I/O device in the second computing device the subset of the first audio data from the first computing device through the communication channel;

registering with the second processor in the second computing device the second audio data with reference to the subset of the first audio data to generate registered second audio data, the registered second audio data including recorded audio corresponding to the subset of the first audio data at a recorded time that corresponds to another recorded time of the subset in the first audio data generated by the first computing device; and generating with the second processor in the second computing device the reconstructed audio data by performing the predetermined error correction process with the error correction data and the registered second audio data.

7. The method of claim 2 further comprising:

generating with the first processor in the first computing device a first feature vector corresponding to the first sensor data;

generating with the first processor in the first computing device the error correction data corresponding to the first feature vector; and generating with the first processor in the first computing device the first cryptographic key with reference to the first hashed value of the first feature vector.

8. The method of claim 7 further comprising:

generating with the second processor in the second computing device a second feature vector corresponding to the second sensor data;

generating with the second processor in the second computing device the reconstructed sensor data as a reconstructed feature vector corresponding to the first sensor data by performing the predetermined error correction process with the error correction data and the second feature vector;

generating with the second processor in the second computing device the second cryptographic key with reference to a second hashed value corresponding to the reconstructed feature vector.

* * * * *